T. S. HOMANS.
MOLD FOR LINE CASTING MACHINES.
APPLICATION FILED JUNE 4, 1913.
1,225,632.
Patented May 8, 1917.
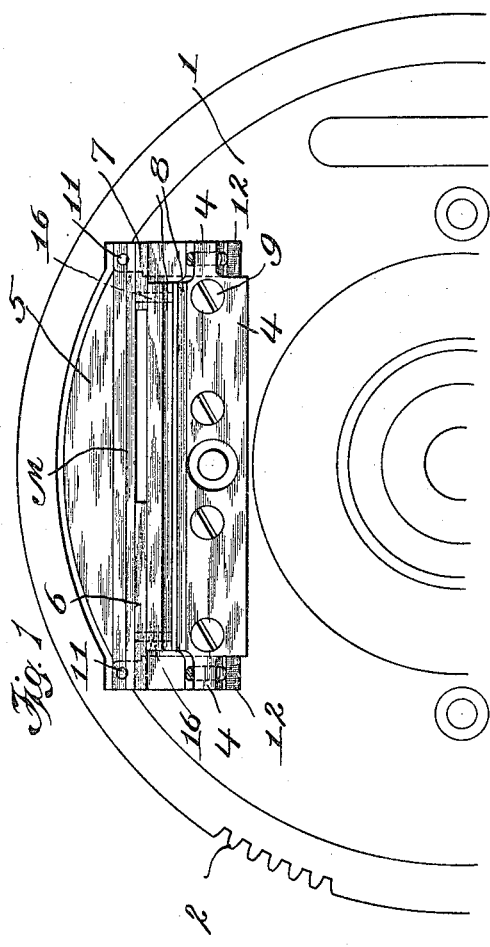
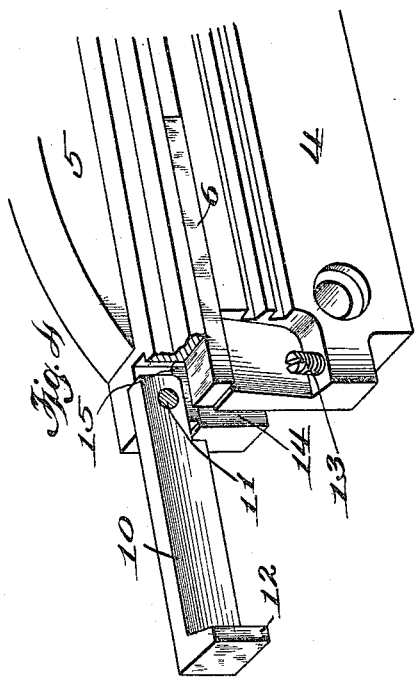
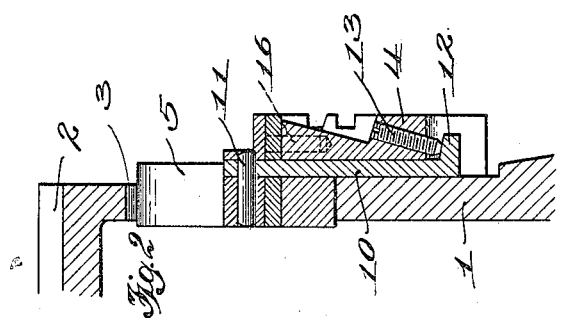
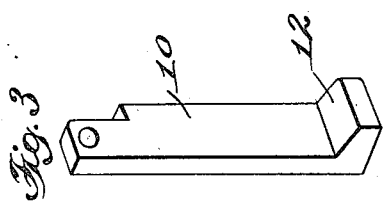
WITNESSES:
INVENTOR
Thomas S. Homans
BY
ATTORNEY

UNITED STATES PATENT OFFICE.

THOMAS S. HOMANS, OF HEMPSTEAD, NEW YORK, ASSIGNOR TO INTERTYPE CORPORATION, OF NEW YORK, N. Y., A CORPORATION OF NEW YORK.

MOLD FOR LINE-CASTING MACHINES.

1,225,632.   Specification of Letters Patent.   Patented May 8, 1917.

Application filed June 4, 1913. Serial No. 771,766.

*To all whom it may concern:*

Be it known that I, THOMAS S. HOMANS, a citizen of the United States, residing at Hempstead, in the county of Nassau and State of New York, have invented new and useful Improvements in Molds for Line-Casting Machines, of which the following is a specification.

This invention relates to improvements in line casting machines, and more especially to those of the linotype class which employ a mold wheel carrying molds each composed of a mold body, a cap, and liners interposed between the body and cap and forming therewith a cavity in which the slug is cast. The primary object of the present invention is to provide improved means for holding together the mold body and cap, such means being adjustable to enable liners of different thicknesses to be accommodated between the body and cap.

To this end, the invention consists in certain improvements, and combinations and arrangements of parts, all as will be hereinafter more fully described, the novel features being pointed out particularly in the claims at the end of the specification.

In the accompanying drawing:—

Figure 1 is a front elevation of a portion of a mold wheel and a mold mounted thereon, the mold being constructed in accordance with the present invention;

Fig. 2 represents a vertical section through the left-hand end of the mold as shown in Fig. 1, the parts being on an enlarged scale;

Fig. 3 is a detail perspective view of one of the improved clamps or connecting devices;

Fig. 4 is a perspective view of the left-hand end of the mold and showing the mode of operation of the improved clamp or connecting device.

Similar parts are designated by the same reference characters in the several views.

The invention in the present instance is shown in connection with a mold of the type employed generally in line casting machines of the linotype class, and the invention will be so described in the specification, although it is to be understood that the invention is not restricted to the particular construction shown, as equivalent constructions may be used within the scope of the claims at the end of this specification.

In the accompanying drawing, 1 represents a portion of the mold wheel or disk as used generally in machines of the linotype class, this wheel or disk being movable to carry the mold to and from the line of matrices from which a cast is to be made, and such wheel or disk is also rotatable to bring the mold containing the cast slug to the ejecting position. Rotation of the mold to effect the latter operation is usually produced by power mechanism including a pinion which coöperates with the gear teeth 2 formed on the rim or periphery of the mold wheel. The mold wheel or disk is provided with a suitable number of slots 3, each adapted to accommodate a mold. Each mold is composed of a mold body 4, a mold cap 5, and liners 6 and 7. The mold body and cap define the top and bottom of the mold cavity M, while the liners 6 and 7 determine the height of this cavity and define the ends thereof. It is customary to employ a number of liners of different thicknesses to enable the casting of slugs of different thicknesses, and the length of the line or slug to be cast is gaged by the length of the left-hand liner 6. The mold body 4 is formed with ledges or keepers 8 to coöperate with the lugs on the lower corners of the matrices, thereby alining them properly before the mold, and this mold body is secured in fixed position on the mold wheel by the screws 9. Various means may be devised for holding the mold cap to the body of the mold. A common way is to hold the mold cap in position by screws passing through the rim of the mold wheel or disk, but such arrangements have proven objectionable for the reason that the rim of the mold wheel is light and is often broken by the strain imposed thereon by tightening of the mold cap screws. Also, bolts have been used which passed through the liners, but such arrangements are also objectionable for the reason that removal of the bolts is necessary before the liner can be removed from the mold. The present invention provides a simple and convenient means for connecting the mold cap and body and which obviates the objections incident to the use of other devices heretofore proposed and used for such purpose. As shown in the drawing, a pair of clamping or connecting members 10 are hinged to the opposite ends of the mold cap 5 by the pivot pins 11, these members being formed at their lower ends with lugs or shoulders 12 which project forwardly. The mold body is provided at its opposite ends with screws 13 which, when the clamping or connecting members 10 are swung into operative position, will occupy positions to coöperate with the forwardly-projecting lugs or shoulders 12. These screws 13 are preferably inclined in order to facilitate the application of a screw-driver thereto to turn the screws either in a direction to apply a downward pressure on the members 10, thereby drawing the mold cap down firmly upon the liners resting on the top of the mold body, or to loosen the screws and thereby permit the connecting members to be swung outwardly beyond the ends of the mold and enable the mold cap to be removed by sliding it forwardly with respect to the mold wheel. The mold body is formed at each end with a slot 14 to enable the respective connecting member 10 to swing into operative position, and each liner is also formed at its end with a slot 15 which accommodates the respective connecting member 10 when the latter assumes an operative position. The walls of the slot 15 in each liner may, if desired, be fitted closely to the corresponding surfaces of the respective member 10 whereby the latter will serve to position the liner in a face-wise direction, or these liners may be positioned, as usual, by dowels 16.

The present invention provides means which is independent of the rim of the mold wheel for connecting and securing together the mold cap and body, and it enables the mold to be opened and liners of different lengths or thicknesses to be inserted and then secured, with facility, as it is only necessary when it is desired to change a pair of liners to loosen the screws 13, thereby freeing the connecting or clamping members 10 and swinging these connecting members outwardly into a horizontal position, the mold cap being then free to be removed and the liners may be then changed. After the liners have been changed, the members 10 are swung downwardly, bringing the lugs or shoulders 12 thereon beneath the respective screws 13 and the latter are then tightened to secure the mold cap and liners in position. The screws 13 constitute adjustable means for accommodating liners of different thicknesses between the mold body and cap.

I claim as my invention:—

1. In a mold of the class described, the combination of a mold having relatively separable parts to form the top and bottom walls of the mold cavity, and means for holding together the mold parts comprising a clamp member attached to one of the mold parts and having an offset lug within the plane of the mold, and an adjustable member on the other mold part coöperative with said lug to exert pressure to hold the mold cap and body together.

2. In a slug-casting mold for machines of the class described, the combination of the mold body, the mold cap, clamp members pivotally attached to one of said mold parts to swing toward and from the respective ends of the mold and provided with shoulders, and adjustable devices on the other mold part arranged to act on said shoulders to draw the cap and body relatively toward one another.

3. In a line casting mold, the combination of the body portion, the cap portion, the interposed liners, clamp members pivotally connected to the cap and extending into the body portion and having steps or shoulders offset to occupy positions in the plane of the mold, and pressure devices on the body adapted to act on said steps whereby the body and cap may be held to the liners.

4. In combination in a line casting mold, the body, the superposed cap, the liners interposed between said cap and body, connections extending from the cap down to the body and provided with forwardly offset steps, and downwardly-acting screws in the body adapted to engage the connections and thereby hold down the cap.

In testimony whereof I have hereunto set my hand in presence of two subscribing witnesses.

THOMAS S. HOMANS.

Witnesses:
   Con. A. Kreig,
   W. E. Bertram.

Copies of this patent may be obtained for five cents each, by addressing the "Commissioner of Patents, Washington, D. C."